US009385824B2

(12) United States Patent
Hagiwara et al.

(10) Patent No.: US 9,385,824 B2
(45) Date of Patent: Jul. 5, 2016

(54) DIGITAL MIXER

(75) Inventors: Hideki Hagiwara, Hamamatsu (JP); Takamitsu Aoki, Hamamatsu (JP)

(73) Assignee: YAMAHA CORPORATION, Hamamatsu-shi (JP)

( * ) Notice: Subject to any disclaimer, the term of this patent is extended or adjusted under 35 U.S.C. 154(b) by 562 days.

(21) Appl. No.: 12/890,080

(22) Filed: Sep. 24, 2010

(65) Prior Publication Data

US 2011/0075864 A1 Mar. 31, 2011

(30) Foreign Application Priority Data

Sep. 28, 2009 (JP) ................................ 2009-221938

(51) Int. Cl.
*G06F 17/00* (2006.01)
*H04H 60/04* (2008.01)

(52) U.S. Cl.
CPC .................................... *H04H 60/04* (2013.01)

(58) Field of Classification Search
CPC ...................................................... H04H 60/04
USPC ............................................ 700/94; 381/119
See application file for complete search history.

(56) References Cited

U.S. PATENT DOCUMENTS 4,879,751 A * 11/1989 Franks et al. ................ 381/119
6,281,941 B1 * 8/2001 Windrem ...................... 348/585
7,436,971 B2 * 10/2008 Terada et al. ................ 381/119
8,077,883 B2 * 12/2011 Cabot .......................... 381/123
8,098,850 B2 * 1/2012 Terada et al. ................ 381/119
2004/0028248 A1 2/2004 Terada et al.
2004/0184624 A1 * 9/2004 Komiyama et al. ........... 381/119
2004/0184625 A1 * 9/2004 Okabayashi et al. ......... 381/119
2007/0229474 A1 * 10/2007 Okabayashi .................. 345/173
2008/0219476 A1 * 9/2008 Okabayashi .................. 381/119
2011/0013786 A1 * 1/2011 Odom et al. .................. 381/109

FOREIGN PATENT DOCUMENTS

JP 3918676 B2 5/2007

OTHER PUBLICATIONS

Yamaha DME Designer: Copyright and available for sale 2004.*
SSL 9000 j recording console copyright 1996.*
"PM5D Digital Mixing Console PM5D/PM5D-RH V2 DSP5D Owner's Manual" by Yamaha Corporation, 2004, pp. 293-297.
"PM1D System Softward V1.5 Supplementary Manual" by Yamaha Corporation, 2002, pp. 58-60.

* cited by examiner

*Primary Examiner* — Paul McCord
(74) *Attorney, Agent, or Firm* — Rossi, Kimms & McDowell LLP

(57) ABSTRACT

A digital mixer includes a MO switch and a MO fader in a signal transmission route from each input channel to a bus of a MIX_MINUS type, a signal of the input channel is supplied to the MIX bus without control on its level when the MO switch is OFF, while being supplied to the MIX bus after being controlled on its level by the MOL fader when the MO switch is ON. When the MO switch is changed from OFF to ON, a level adjustment amount by the MOL fader is set to a value so that a signal passing therethrough comes to have zero level.

14 Claims, 12 Drawing Sheets

DIGITAL MIXER

BACKGROUND OF THE INVENTION

1. Field of the Invention

The invention relates to a digital mixer mixing audio signals supplied from a plurality of input channels to mixing buses.

2. Description of the Related Art

Digital mixers mixing audio signals supplied to mixing buses from a plurality of input channels have conventionally been structured so that parameters regarding output ON/OFF, level adjustment, and so on in signal transmission routes to the respective buses can be set for each of the input channels.

Digital mixers have also been structured so that the type of the mixing buses can be selected and signal processing performed in signal supply routes is selected according to the type of the send-destination buses. For example, the processing performed when the send-destination bus is of a VARI type is to switch acquisition positions of an audio signal that is to be sent to the mixing bus, to switch output ON/OFF, and to adjust level, whereas the processing performed when the send-destination bus is of a FIX type is only to switch ON/OFF while keeping the acquisition position and level fixed.

Another known function is a function called "mix-minus" that semi-automates the setting for preventing the supply of a signal from an arbitrary one of the plural input channels to the mixing bus. An example of the application of this function is when an announcer inputs his/her own voice to a microphone while monitoring mixed sound. In order to prevent the announcer from having a difficulty in speaking because he/she hears his/her own voice in the mixed sound with a delay due to a delay occurring in the mixing, the announcer's voice is removed from the final mixing result when an audio signal for monitoring is generated.

Such a mix-minus function is described in, for example, the following Documents 1 to 3.

Document 1: Jananese Patent Gazette No. 3918676

Document 2: "PMSD/PMSD-RH V2 DSP5D Owner's Manual", Yamaha Corporation, 2004, p. 293-297

Document 3: "PM1D System Software V1.5 Supplementary Manual", Yamaha Corporation, 2002, p. 58-60

SUMMARY OF THE INVENTION

However, the mix-minus function in conventional digital mixers described in the Documents 1 to 3 simply sets a parameter of the signal processing in a signal transmission route to mixing buses from an input channel that is a target of the removal, to a value preventing the signal supply (for example, adjusts level to $-\infty$ dB).

This has involved a problem that, even under the setting using the mix-minus function, it is not easily known whether or not the processing utilizing the mix-minus function is currently progressing in a digital mixer or in which part the processing utilizing the mix-minus function is progressing. For example, even by seeing a parameter regarding the signal supply to a given mixing bus from each input channel, it is not easily known whether or not the parameter is one set by using the mix-minus function.

Further, since even a value of a parameter set by using the mix-minus function is later changeable to any value as are values of other parameters, there has been a problem that only a small operation mistake easily breaks the signal processing state set by using the mix-minus function.

The mix-minus function in conventional digital mixers is only capable of the setting for completely muting a signal inputted from an input channel that is a target of the removal and thus has a problem of incapability of responding to a demand for leaving a desired level.

It is an object of the invention to solve the above problems and to make it possible to easily and reliably make the setting for removing or attenuating an audio signal supplied from a specific input channel when audio signals are mixed, in a digital mixer mixing, in mixing buses, audio signals supplied from a plurality of input channels.

In order to achieve the above-described object, digital mixer of the invention is a digital mixer including: a first mixing bus that mixes audio signals supplied thereto from a plurality of input channels; a second mixing bus that mixes audio signals supplied thereto from the plurality of input channels; a plurality of first controllers, each of which is provided in each of the input channels, the first controller in each input channel controls sound characteristics of an audio signal inputted to the input channel and supplying the controlled audio signal to the first mixing buses; a memory that, for each input channel, stores a first parameter of the input channel indicating an ON/OFF state and a second parameter of the input channel indicating a send level; a plurality of second controllers, each of which is provided in each of the input channels, wherein the second controller in each input channel a) controls a level of an audio signal, same as the audio signal outputted from the first controller in the input channel to the first mixing bus, in accordance with the send level indicated by the second parameter of the input channel in the memory and supplies the controlled audio signal to the second mixing buses when the first parameter of the input channel in the memory indicates the ON state, and b) supplies an audio signal, same as the audio signal outputted from the first controller in the input channel to the first mixing bus, to the second mixing buses without controlling the level of the audio signal when the first parameter of the input channel in the memory indicates the OFF state; a first parameter editor that toggles the ON/OFF state of the first parameter of one input channel in the memory in response to a first operation by a user, and if the first parameter is changed from the OFF state to the ON state, the first parameter editor further sets the second parameter of the one input channel to a zero level as an initial value; and a second parameter editor that changes the second parameter of one input channel, whose first parameter indicates the ON state, in the memory in response to a second operation by the user.

In the above digital mixer, it is conceivable that even when the value of the first parameter of one of the input channels is already set to the ON state, the first parameter editor is able to additionally set the first parameter of another input channel to the ON state.

It is also conceivable that the digital mixer further includes: a display; and a display controller that controls the display in such a way that the display displays a button indicating the value of the first parameter of one input channel in the memory, a) the display displays the value of the second parameter of the one input channel in the memory when the first parameter of the one input channel indicates the ON state, and b) the display does not display the value of the second parameter of the one input channel in the memory when the first parameter of the one input channel indicates the OFF state, wherein the first parameter editor changes, in response to the first operation by the user on the button displayed for the one input channel on the display, the value of the first parameter of the one channel in the memory, and wherein the second parameter editor changes, in response to the second operation by the user on the value of the second parameter of the one input channel displayed on the display, the value of the second parameter of the one input channel in the memory.

Another digital mixer of the invention is a digital mixer including: a display; a first mixing bus that mixes audio signals supplied thereto from a plurality of input channels; a second mixing bus that mixes audio signals supplied thereto from the plurality of input channels; a plurality of first controllers, each of which is provided in each of the input channels, the first controller in each input channel controls sound characteristics of an audio signal inputted to the input channel and supply the audio signal after the control to the first mixing bus; a type selector that selects a type of the second mixing bus from among first to third types; a memory that stores, regarding each of the plurality of input channels, a) when the type selector selects the first type, values of a first parameter of the input channel indicating an ON/OFF state and a second parameter of the input channel indicating a send level, b) when the type selector selects the second type, a value of a third parameter of the input channel indicating an ON/OFF state, and c) when the type selector selects the third type, values of a fourth parameter of the input channel indicating an ON/OFF state and a fifth parameter of the input channel indicating a send level; a plurality of second controllers, each of which is provided in each of the input channels, operative when the type selector selects the first type, the second controller in each input channel a) controls a level of an audio signal, same as the audio signal outputted from the first controller in the input channel to the first mixing bus, based on the value of the second parameter of the input channel and supply the audio signal after the control to the second mixing bus when the first parameter of the input channel indicates the ON state, and b) supply an audio signal, same as the audio signal outputted from the first controller in the input channel to the first mixing bus, to the second mixing bus without controlling the level of the audio signal when the first parameter of the input channel indicates the OFF state; a plurality of third controllers, each of which is provided in each of the input channels, operative when the type selector selects the second type, the third controller in each input channel a) supplies an audio signal processed in the input channel to the second mixing bus without controlling the level of the audio signal when the third parameter of the input channel indicates the ON state, and b) supplies no audio signal in the input channel to the second mixing bus when the third parameter of the input channel indicates the OFF state; a plurality of fourth controllers, each of which is provided in each of the input channels, operative when the type selector selects the third type, the fourth controller in each input channel a) controls a level of an audio signal processed in the input channel based on the value of the fifth parameter of the input channel and supply the audio signal after the control to the second mixing bus when the fourth parameter of the input channel indicates the ON state, and b) supplies no audio signal in the input channel to the second mixing bus when the fourth parameter of the input channel indicates the OFF state; a display controller that controls the display to display a button indicator and a level indicator for one input channel in such a way that: a) when the type selector selects the first type, the display displays the button indicator indicating the value of the first parameter of the one input channel, and further displays a-1) the level indicator in a first style indicating the value of the second parameter of the one input channel when the first parameter of the one input channel indicates the ON state, and a-2) the level indicator in a second style indicating that an audio signal in the one input channel is sent to the second mixing bus without control on its level when the first parameter of the one input channel indicates the OFF state; b) when the type selector selects the second type, the display displays the button indicator indicating the value of the third parameter, and further displays b-1) the level indicator in the second style indicating that an audio signal in the one input channel is sent to the second mixing bus without control on its level when the third parameter of the one input channel indicates the ON state, and b-2) the level indicator in a third style indicating that no audio signal in the one input channel is sent to the second mixing bus when the third parameter of the one input channel indicates the OFF state; and c) when the type selector selects the third type, the display displays the button indicator indicating the value of the fourth parameter of the one input channel, and further displays c-1) the level indicator in the first style indicating the value of the fifth parameter of the one input channel when the fourth parameter of the one input channel indicates the ON state, and c-2) the level indicator in a fourth style indicating the value of the fifth parameter of the one input channel and indicating that no audio signal in the one input channel is sent to the second mixing bus when the fourth parameter of the one input channel indicates the OFF state; and a parameter editor that changes the values of the first to fifth parameters of the one input channel in the memory in response to operation by a user on the button indicator and the level indicator displayed for the one input channel on the display, in such a way that a) when the type selector selects the first type, the parameter editor toggles the ON/OFF state of the first parameter in response to the operation on the button indicator by the user, and if the change is from the OFF state to the ON state, then further sets the second parameter to a zero level, and in a case where the first parameter indicates the ON state and therefore the level indicator is displayed in the first style, changes the value of the second parameter in response to the operation on the level indicator by the user, b) when the type selector selects the second type, the parameter editor toggles the ON/OFF state of the third parameter in response to the operation on the button indicator by the user, and c) when the type selector selects the third type, the parameter editor toggles the ON/OFF state of the fourth parameter in response to the operation on the button indicator by the user, and changes the value of the fifth parameter in response to the operation on the level indicator by the user.

DETAILED DESCRIPTION OF THE PREFERRED EMBODIMENTS

Hereinafter, an embodiment for carrying out the invention will be concretely described based on the drawings.

Figure 1:
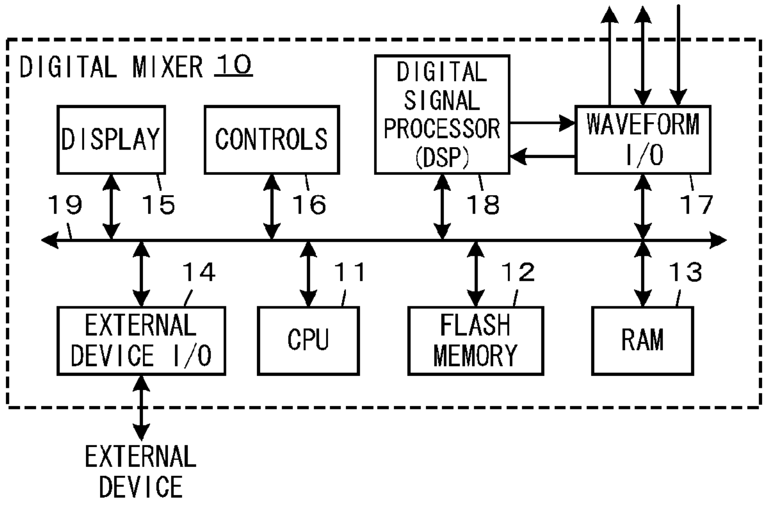
FIG. 1 is a block diagram showing the hardware configuration of a digital mixer being an embodiment of the invention.

First, the configuration of a digital mixer being the embodiment of the invention will be described. FIG. 1 is a block diagram showing the configuration of the digital mixer.

As shown in FIG. 1, the digital mixer 10 includes a CPU 11, a flash memory 12, a RAM 13, an external device input/output module (I/O) 14, a display 15, controls 16, a waveform I/O 17, and a digital signal processor (DSP) 18, which are connected to one another via a system bus 19. The digital mixer 10 has a function of applying various kinds of signal processing to audio signals inputted from a plurality of input channels and outputting the processed audio signals from a plurality of output channels.

The CPU 11, which is a controller centrally controls the operation of the digital mixer 10, executes a predetermined program stored in the flash memory 12, to thereby perform processing such as controlling the input and output of data and signals in the external device I/O 14 and the waveform I/O 17 and the display on the display 15, and detecting an operation to the control 16 to set and change values of parameters and control the operations of the respective parts according to the detected operation.

The flash memory 12 is a rewritable nonvolatile memory storing a control program executed by the CPU 11, and so on.

The RAM 13 is a memory that stores data to be temporarily stored and is used as a work memory of the CPU 11.

The external device I/O 14 is an interface to which various kinds of external devices are connectable to enable the input and output from/to the external devices, and as the external device I/O 14, an interface for the connection to external display, mouse, keyboard for character input, and control panel, and so on is prepared. Even if the display 15 and the control 16 in the main body have quite simple structures, it is expected that the use of these external devices makes it possible to set and change parameters and instruct operations.

The display 15 is a display module displaying various kinds of information according to the control by the CPU 11, and, for example, a liquid crystal panel (LCD) or a light-emitting diode (LED) may be used to form the display 15. In the example described here, the digital mixer 10 includes, as the display 15, a LCD having a size large enough to display at least a graphical user interface (GUI) for accepting the reference and setting of values of the parameters.

The control 16, which is a device for accepting an operation to the digital mixer 10, can be composed of various kinds of keys, buttons, rotary encoders, sliders, and so on. Here, a touch panel stacked on the LCD being the display 15 is also used.

The waveform I/O 17 is an interface for accepting the input of audio signals to be processed in the DSP 18 and outputting the processed audio signals. A plurality of boards among A/D conversion boards each capable of analog input of four channels, D/A conversion boards each capable of analog output of four channels, and digital input/output boards each capable of digital input/output of eight channels can be installed in appropriate combination on the waveform I/O 17. Actually, the waveform I/O 17 performs input and output of signals via these boards.

The DSP 18 is a signal processor including a signal processing circuit and applying various kinds of signal processing such as mixing and equalizing to audio signals inputted from the waveform I/O 17, according to various kinds of processing parameters set as current data to output the processed audio signals to the waveform I/O 17. The current data including the parameters used for this processing is stored in a current memory provided on the RAM 13 or on a memory included in the DSP 18 itself, and a user can confirm and change values of the data by using the display 15 and the control 16.

Figure 2:
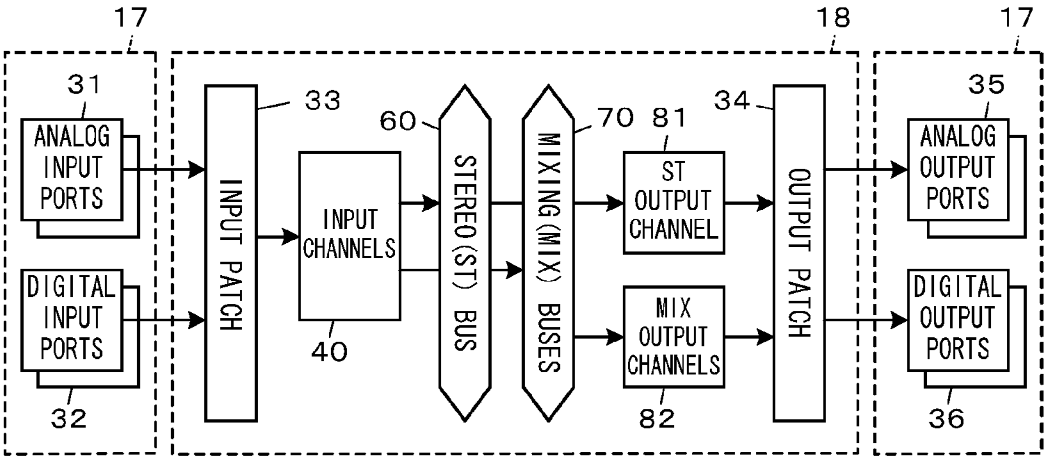
FIG. 2 is a block diagram showing the configuration of signal processing executed in a DSP shown in FIG. 1 in more detail.

Next, FIG. 2 shows the configuration of the signal processing executed in the DSP 18 shown in FIG. 1 in more detail.

As shown in FIG. 2, for the signal processing, the DSP 18 includes an input patch 33, input channels 40, a stereo (ST) bus 60, mixing (MIX) buses 70, a ST output channel 81, MIX output channels 82, and an output patch 34.

In the DSP 18, one of analog input ports 31 and digital input ports 32 which are prepared in the waveform I/O 17 so as to correspond to input terminals is patched (connected) to each of the 24 input channels 40. In each of the input channels, after a signal inputted from the patched port is processed by an attenuator, an equalizer, and so on, the processed signal is sent to the ST bus 60 and to arbitrary buses among the 12-line MIX buses 70. Regarding this signal sending, ON/OFF switching and level adjustment can be performed for each combination of the input channel 40 and the bus.

In the ST bus 60 and each of the MIX buses 70, signals inputted from the input channels 40 are mixed, and a signal obtained by the mixing in the ST bus 60 being a first bus is outputted to the ST output channel 81, whereas signals obtained by the mixing in the MIX buses 70 being second buses are outputted to the twelve MIX output channels 82 provided for the respective lines of the MIX buses. Then, in the output channels 81 and 82, equalizers, compressors, and so on process the signals inputted from the corresponding buses, and the processed signals are patched by the output patch 34 to analog output ports 35 and digital output ports 36, which are prepared in the waveform I/O 17 so as to correspond to output terminals, and are outputted from the patched output ports.

It is possible to control the signal processing by these parts provided in the DSP 18 by setting values of predetermined parameters stored in the current memory, and the functions of these parts may be realized by software or by hardware.

Figure 3:
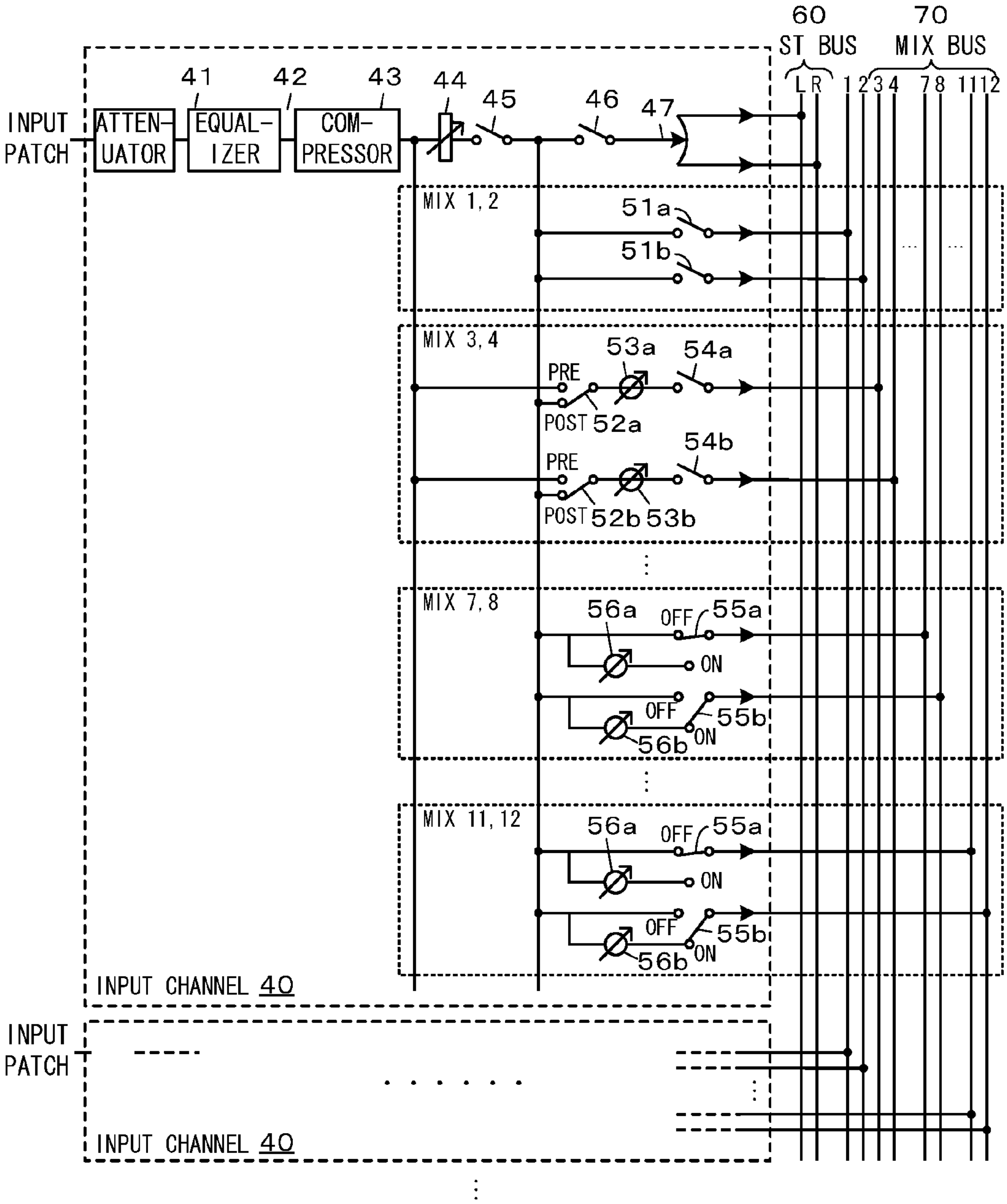
FIG. 3 is a view showing the configuration of parts involved in the input of signals from input channels to a ST bus and MIX buses, in the signal processing in the DSP.

Next, FIG. 3 shows the configuration of a part involved in the input of signals from the respective input channels to the ST bus and the MIX buses, in the signal processing in the DSP 18.

As shown in FIG. 3, the input channels 40 each have an attenuator 41, an equalizer 42, a compressor 43, a channel fader 44, and an ON switch 45. Further, in each route provided on a subsequent stage of the ON switch 45 to input signals to the ST bus 60, a TO_ST (to-stereo) switch 46 and a pan 47 are provided as a first controller.

The attenuator 41 adjusts level of a signal inputted to such an input channel 40 to level suitable for the signal processing based on an attenuator parameter, the equalizer 42 adjusts a frequency characteristic of the signal based on an equalizer parameter, the compressor 43 adjusts an amplitude of the signal based on a compressor parameter according to a dynamic change characteristic, and the channel fader 44 adjusts level of the resultant signal to level suitable for mixing in the ST bus based on a fader parameter. The signal outputted from the channel fader 44 passes through the ON switch 45 and the TO_ST switch 46 when corresponding ON parameters are ON and is level-adjusted in the pan 47 individually for L and for R based on a stereo pan parameter, and the signal with the level for L and the signal with the level for R are inputted to a L-line and R-line of the ST bus 60 respectively.

Further, in a route for signal input to the MIX buses 70, a sending section compatible with the type of buses is provided for each group composed of two buses. As this type, any one selected from three types, that is, FIX (second type), VARI (third type), and MIX_MINUS (first type) can be set for each of the groups.

The sending section composed of the buses set as the FIX type includes, as a third controller, send ON switches 51*a* and 51*b* provided in each of the two buses. In FIG. 3, a group MIX 1, 2 composed of a first and a second MIX bus is of the FIX type.

In this sending section, the send ON switches 51*a* and 51*b* allow a signal at a position after the ON switch 45 in the route of the input channel to pass therethrough to be supplied to the send-destination buses without controlling the level of the audio signal when values of corresponding ON parameters are ON, whereas no audio signal passes therethrough to be supplied to the send-destination buses when values of corresponding ON parameters are OFF, which processing is performed independently for each of the send-destination buses.

The sending section composed of the buses set as the VARI type includes, as a fourth controller, PRE/POST switches 52*a* and 52*b*, send level faders 53*a* and 53*b*, and send ON switches 54*a* and 54*b* each of which is provided in each of the two input channels. In FIG. 3, a group MIX 3, 4 composed of a third and a fourth MIX bus is of the VARI type.

In this sending section, the PRE/POST switches 52*a* and 52*b* each select a signal at a position, in the route of the input channel, corresponding to a PRE parameter (if PRE, a position before the channel fader 44, and if POST, a position after the ON switch 45), the send level faders 53*a* and 53*b* control the level of the selected signals by adjusting the selected signals to levels suitable for mixing in the relevant buses based on a send level (SL) parameter, and the send ON switches 54*a* and 54*b* allow the resultant signals to pass therethrough to be supplied to the send-destination buses when values of corresponding ON parameters are ON, whereas no audio signal passes the send ON switches 54*a* and 54*b* to be supplied to the send-destination buses when values of corresponding ON parameters are OFF, which processing is performed independently for each of the send-destination buses.

The sending section composed of buses set as the MIX_MINUS type includes, as a second controller, minus-one (MO) switches 55*a* and 55*b* and minus-one level (MOL) faders 56*a* and 56*b* provided in each of the two buses. In FIG. 3, a group MIX 7, 8 composed of a seventh and an eighth MIX bus and a group MIX 11, 12 composed of an eleventh and a twelfth MIX bus are of the MIX_MINUS type.

In each of these sending sections, the MOL faders 56*a* and 56*b* control the level of the signal at the position after the ON switch 45 in the route of the input channel, which is the audio signals same as the audio signal outputted from the input channel to said first mixing bus after being processed by the attenuator 41 to ON switch 45, with desired gains based on a MOL parameter when values of a minus-one (MO_ON) parameter corresponding to the MO switches 55*a*, 55*b* are ON (first state), while inputting the signal at the above position as it is to the send-destination buses without controlling the level of the audio signal when the values of the MO parameter are off (second state), which processing is performed independently for each of the send-destination buses.

In FIG. 3, only the structure of one of the input channels 40 is shown in detail, but the other 23 input channels each also have the same structure, and in the ST bus 60 and each of the MIX buses 70, the signals supplied thereto from these 24 input channels can be mixed.

Here, a user can arbitrarily select the type of the buses of each of the groups, and the CPU 11 functioning as a type selector sets the type according to the designation from the user.

One feature of the digital mixer 10 lies in that MIX_MINUS is selectable as the type of the MIX buses 70. In inputting signals to the buses of this type, signals of an arbitrary number of the input channels can be easily removed by the operation of the MO switches 55, and by the operation of the MOL fader 56, the setting can be easily made so that the signals of the removal-target input channels are inputted to the MIX buses after being attenuated by desired level, instead of being completely removed.

Now, manners how values of parameters used in sending signals to the MIX buses of the MIX_MINUS type from the input channels 40 are displayed and edited and processing necessary for the display and editing will be described together with those for the MIX buses of the other types.

First, the structure of a console of the digital mixer 10 will be described.

Figure 4:
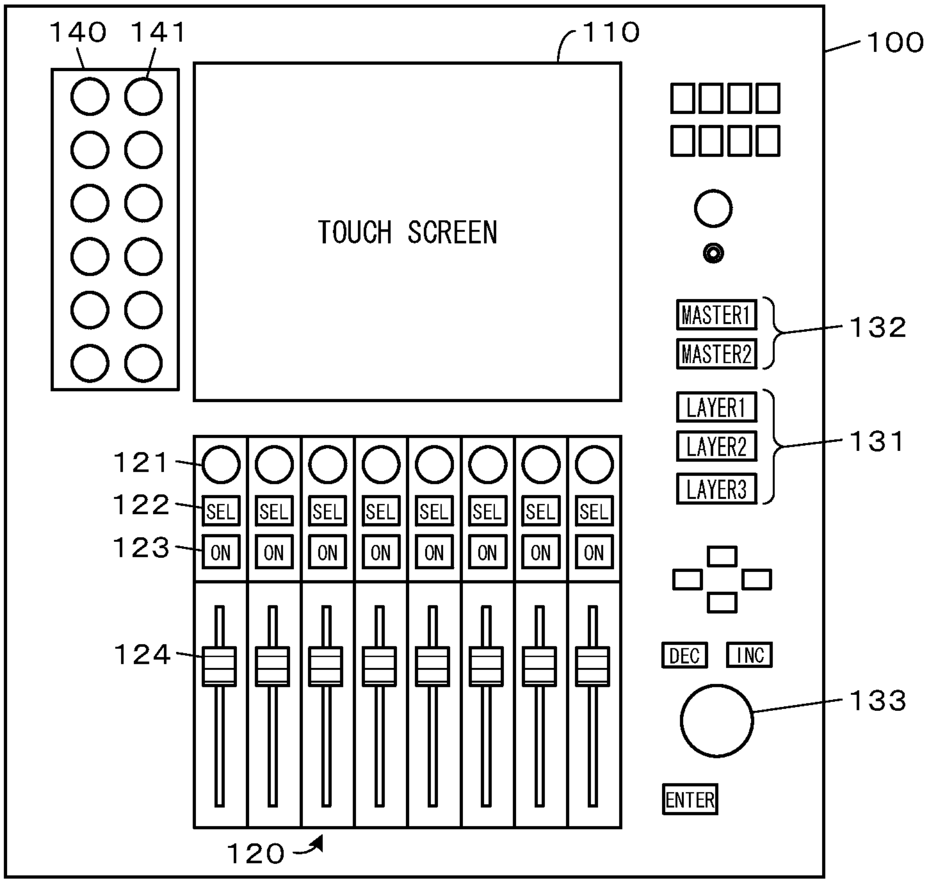
FIG. 4 is a view showing a rough structure of a console of the digital mixer shown in FIG. 1.

FIG. 4 is a view showing a rough structure of the console.

The digital mixer 10 has a console 100 having the structure shown in FIG. 4, and on the console 100, various kinds of user interfaces are provided such as a touch screen 110, an assigned-channel strip section 120, input layer selection switches 131, output layer selection switches 132, a rotary encoder 133, and a send level setting section 140. These constituent elements correspond to the display 15 and the control 16 in FIG. 1.

Among them, the touch screen 110, which has a touch panel on an LCD, displays a GUI for the reference and setting of values of the parameters used in the signal processing and accepting an operation from a user.

The assigned-channel strip section 120 has eight channel strips each for setting values of the parameters for one input channel or one output channel. The channel strips are assigned channels of a layer according to an operation of the input layer selection switches 131 or the output layer selection switches 132, and the assigned channel strip section 120 is a section used as a control for setting the parameters of the assigned channels.

The channel strips each include a channel knob 121, a selection switch 122, an ON switch 123, and a fader 124.

Among them, the channel knob 121 is a rotary encoder whose knob rotation amount can be detected as an operation amount. The channel knob 121 can be assigned a control on a screen displayed on the touch screen 110 and can be used for setting a value of a parameter corresponding to this assigned control, though detailed description thereof will be omitted.

The selection switch 122 is a control for setting selection and non-selection of the corresponding channel. According to a user's operation of the selection switch 122, the CPU 11 of the digital mixer 10 selects the channel corresponding to the channel strip to which the operated selection switch 122 belongs and cancels the selection of the channel that has been selected so far.

The ON switch 123 is a control for setting ON/OFF of the corresponding channel (when the input channel is assigned to the channel strip, ON/OFF of the ON switch 45 shown in FIG. 3).

The fader 124 is a control for setting signal level of the corresponding channel (when the input channel is assigned to the channel strip, the level adjustment amount in the channel fader 44 shown in FIG. 3).

Further, a knob of the fader 124 is drivable by a motor, and when there occurs a change in a parameter value corresponding to the fader 124 due to a change of a layer, reading of a parameter value, and editing of the parameter by another control, the CPU 11 of the digital mixer 10 drives the motor to move the knob to a position corresponding to a value after the change.

Next, the input layer selection switch 131 and the output layer selection switch 132 are switches each for exclusively selecting a layer whose input channels 40 or MIX output channels 82 are to be assigned to the channel strips of the assigned-channel strip section 120.

As the input layer selection switch 131, there are provided three controls for selecting layers whose input channels, that is, first to eighth input channels, ninth to sixteenth input channels, and seventeenth to twenty-fourth input channels into which the 24 input channels 40 are divided in a unit of eight channels are to be assigned to the channel strips.

As the output layer selection switch 132, there are provided two controls for selecting layers whose first to sixth MIX output channels and seventh to twelfth MIX output channels into which the twelve MIX output channels 82 are divided in a unit of six channels are to be assigned to the first to sixth channel strips. When these MIX output channels are assigned, there are no channel corresponding to the seventh and eighth channel strips.

The rotary encoder 133 is a common control usable for editing any parameter assigned to the rotary encoder 133, among various kinds of parameters. For example, touching a symbol of a knob in a screen displayed on the touch screen 110 can trigger the assignment of a corresponding parameter to the rotary encoder 133.

Next, the send level setting section 140 is a section where controls for setting send levels of signals that are to be sent from the input channel to the MIX buses are gathered, and has twelve send knobs 141 corresponding to the 12-line MIX buses 70 respectively.

The send knobs 141 are rotary encoders, and by rotating each of the send knobs 141, it is possible to increment and decrement a level parameter of a signal that is to be outputted from the currently selected input channel to the MIX bus of the line corresponding to the knob. A concrete parameter to be incremented or decremented differs depending on the type of the bus.

First, in the FIX mode, since a level parameter is not provided regarding the transmission route, the operation of the send knob 141 is invalid. In the VARI mode, a SL parameter corresponding to the send level fader 53 is incremented and decremented according to the operation of the send knob 141. In the MIX_MINUS mode, when a value of a MO_ON parameter corresponding to the MO switch 55 is ON, the MOL parameter corresponding to the MOL fader 56, indicating a send level at the MOL fader 56, is incremented and decremented according to the operation of the send knob 141. When the value of the MO_ON parameter is OFF, since the MOL fader 56 is not practically used, there is no need to adjust the level parameter and thus the operation of the send knob 141 is invalid.

Further, a depression operation of the send knob 14 is also possible. By continuing the depression operation of the send knob 141 for a short time, it is possible to display, on the touch screen 110, a later-described send setting display section 220 for displaying elements for the setting of the output from the selected input channel to each of the MIX buses.

Next, among screens displayed on the touch screen 110, those involved in the setting of the parameters used for the signal processing in the signal transmission routes from the input channels 40 to the MIX buses 70 will be described.

Figure 5:
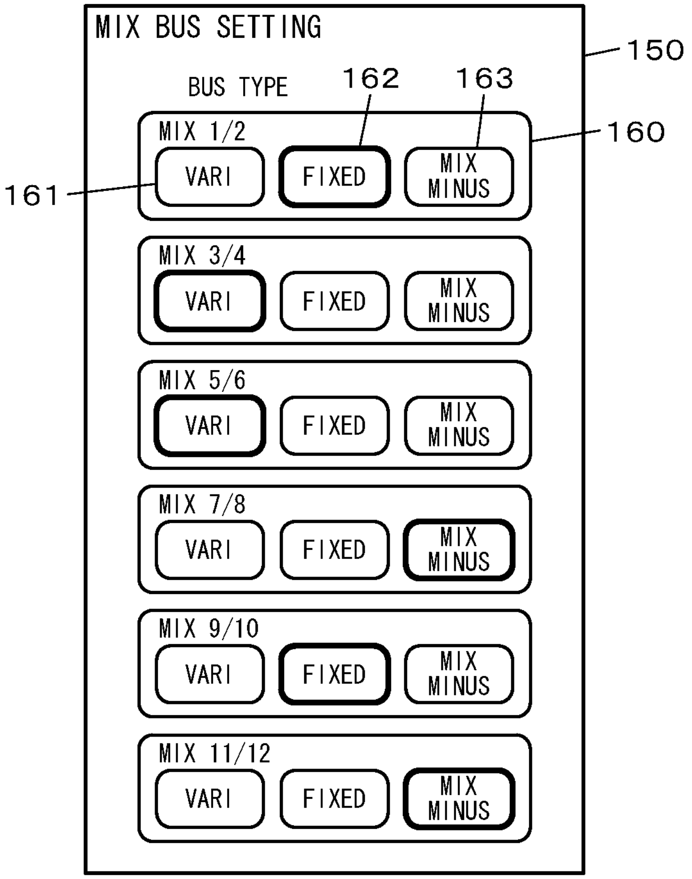
FIG. 5 is a view showing an example of a MIX bus setting screen displayed on a touch screen shown in FIG. 4.

First, FIG. 5 shows an example of a MIX bus setting screen for accepting the setting of the type of each of the buses.

The MIX bus setting screen 150 shown in FIG. 5 is a GUI displayed on the aforesaid touch screen 110 in response to a user's operation, and has bus type setting sections 160 each displaying the type currently selected for the buses of the corresponding MIX bus group and accepting an operation for selecting the type.

By a VARI button 161, a FIX button 162, and a MIX_MINUS button 163 provided in each of the bus type setting sections 160, the display regarding the VARI type, the FIX type, and the MIX_MINUS type is performed and the setting operation regarding these types is accepted.

Incidentally, the type of the buses is set for "the send-destination buses" and is not set for each of the input channels. When the type of the buses is changed, the structure of the signal transmission routes to the MIX buses of the relevant group is changed in all the input channels according to the change.

Further, in case this change is made, areas for storing necessary parameters corresponding to the type set after the change, as parameters regarding output routes to the MIX buses in a group whose setting is changed, are respectively prepared in the area in which the parameters of the respective input channels are stored, and predetermined initial values are set as values of the parameters as shown in Table 1. Incidentally, the gain of each of the MOL faders 56 may have any initial value since the gain is set to "$-\infty$" at an instant when the corresponding MO switch 55 turns on as will be described later. Alternatively, at an arbitrary instant before the MO switch 55 turns on, the gain may be set to "$-\infty$".

TABLE 1

| Kinds and Initial Values of Parameters for Controlling Operations in Signal Transmission Routes to MIX Buses of Respective Types |
|---|
| FIX type |
| ON/OFF of the send ON switch 51 corresponding to each bus: ON → initial value "OFF" |
| VARI type |
| Switching of the PRE/POST switch 52 corresponding to each bus: PRE → initial value "POST" |
| Gain of the send level fader 53 corresponding to each bus: SL → initial value "$-\infty$" |
| ON/OFF of the send ON switch 54 corresponding to each bus: ON → initial value "OFF" |
| MIX_MINUS type |
| Switching of the MO switch 55 corresponding to each bus: MO_ON → initial value "OFF" |
| gain of the MOL fader 56 corresponding to each bus: MOL → any initial value ($-\infty$) |

Figure 6:
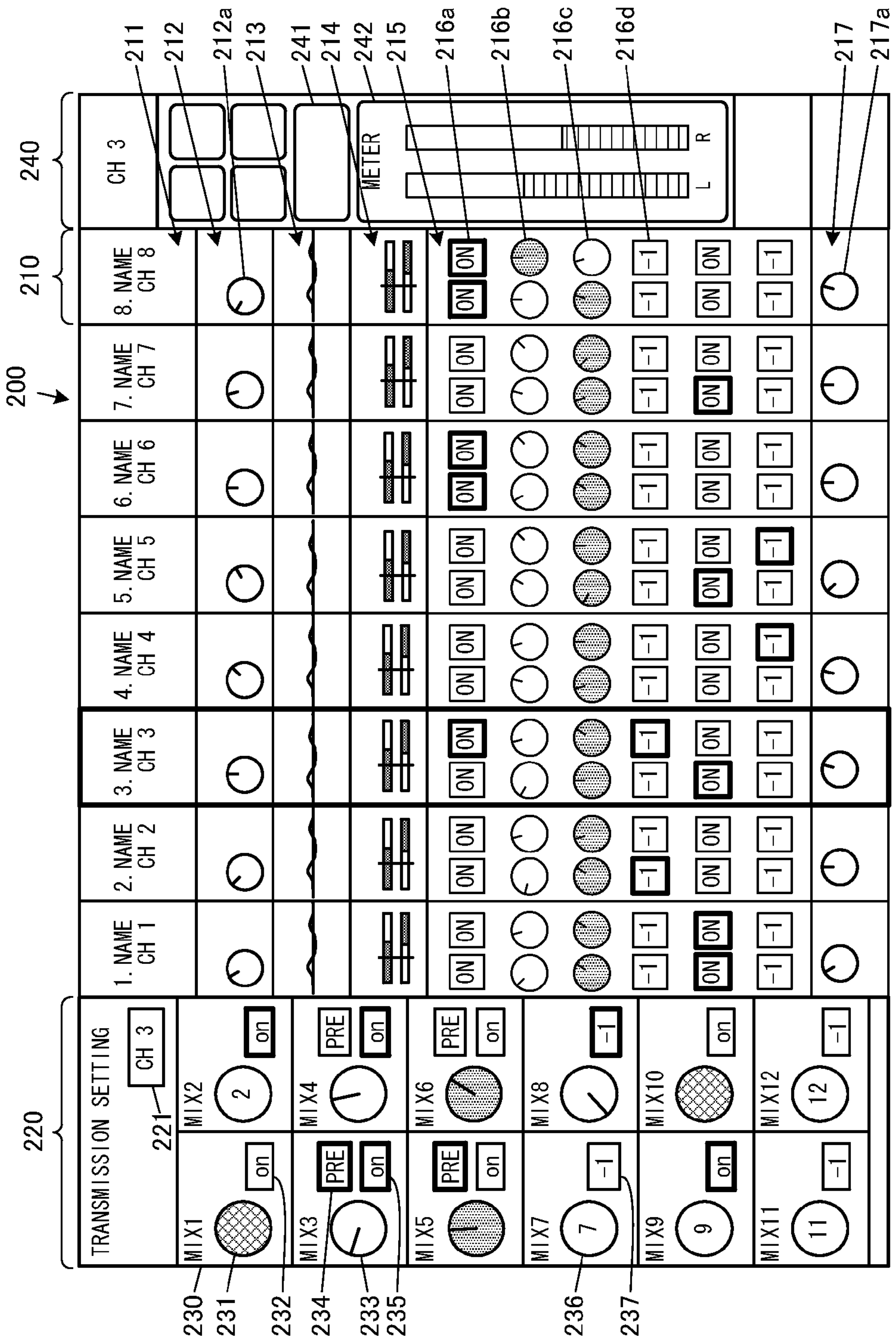
FIG. 6 is a view showing an example of an input channel screen displayed on the touch screen shown in FIG. 4.

Next, FIG. 6 shows an example of an input channel screen.

The input channel screen 200 is a GUI screen for displaying the values currently set as the parameters used for the signal processing in the input channels 40 and for accepting the operation regarding the setting. When one of the layers is selected with one of the input layer selection switch 131, the input channel screen 200 regarding the input channels, of the layer, assigned to the assigned-channel strip section 120 is displayed on the touch screen 110. FIG. 6 shows an example of the screen when the first to eighth input channels are assigned.

This input channel screen 200 includes channel slots 210 corresponding to the respective input channels, and in each of the channel slots 210, the values regarding the corresponding channel are displayed. Further, on the left and right of the screen, a send setting display section 220 and a selected channel display section 240 are provided respectively, and they display information regarding the currently selected channel.

In each of the channel slots 210, a channel name block 211, an attenuator block 212, a frequency characteristic block 213, a compressor block 214, a send level block 215, and a pan block 217 are provided.

Among them, the channel name block 211 is a block displaying the number, name, intended use, and so on of the channel.

The attenuator block 212 is a display section displaying, by a direction of a knob 212*a*, a value of an attenuation amount being the parameter of the attenuator 41 shown in FIG. 3.

The frequency characteristic block 213 is a block displaying a frequency characteristic of the equalizer 42 by a graph based on a current value of the parameter.

The compressor block 214 is a block displaying a value of a threshold being the parameter of the compressor 43 and displaying, by graphs, input level and a gain reduction amount which are real-time values.

Further, in response to a touch operation on any one of these blocks on the touch screen 110, another GUI screen, not shown, corresponding to the operated block is displayed on the touch screen 110.

The send level block 215 is a display section displaying states of the signal processing performed in the output routes from the corresponding input channel to the lines of the MIX buses 70, by output signal symbols 216*a* to 216*d* (collectively denoted by reference numeral 216) corresponding to the types of the output-destination buses. The twelve output signal symbols 216 corresponding to the output routes to the 12-line MIX buses 70 are provided.

As for the buses of the FIX type, the output signal symbols 216*a* indicating ON/OFF of the ON parameter (ON1 or ON2) are displayed. In FIG. 6, symbols surrounded by the heavy frame line indicate ON and symbols surrounded by the thin frame line indicate OFF. As for the busses of the VARY type, the output signal symbols 216*b* (OFF color) and 216*c* (ON color) are displayed which show values of the SL parameter by their directions while bearing the OFF color common to the buses when the values of the ON parameter are OFF, and bearing the ON color determined for the respective send-destination buses when the values of the ON parameter are ON. As for the buses of the MIX_MINUS type, the output signal symbols 216*d* showing ON/OFF of the MO_ON parameter are displayed.

Here, the ON color is chromatic color selected and defined for each bus or for each bus set, by a user. The ON color may be chromatic color pre-defined for each bus. Examples of the ON color are red, yellow, green, blue, and so on. By seeing the ON color of the bus, a user can recognize which bus this bus is. Further, even if the type of the bus is changed, the corresponding color selected for the bus does not change.

The OFF color is achromatic color defined in advance and is, for example, gray or dark gray. By seeing the OFF color of the bus, a user can recognize that no audio signal is being sent to this bus. Incidentally, the OFF color may be color having the same hue as that of the ON color of each of the buses with lowered saturation. Alternatively, it may be color having the same hue as that of the ON color with lowered brightness.

The pan block 217 is a display section displaying, by a direction of a knob 217*a*, a sound image localization position set for each of the pans 47 shown in FIG. 3.

The send setting display section 220 is a screen for displaying the setting status of the output from the selected input channel to each of the MIX buses and accepting a change operation of the status, and is displayed on the left of the first channel slot 210 in response to an operation of one of the send knobs 141 shown in FIG. 4. Incidentally, the same screen is displayed whichever of the twelve send knobs 141 is operated.

The send setting display section 220 includes a channel number display section 221 and send setting sections 230 corresponding to the respective MIX buses.

Among them, the channel number display section 221 is a block displaying the number of the currently selected input channel.

The send setting sections 230 have different structures depending on the type of the corresponding buses.

First, the send setting sections 230 corresponding to the buses of the FIX type each include a send level symbol 231 and a send ON button 232.

Among them, the send ON button 232 is a button indicator indicating ON/OFF of the send ON switch 51 (value of the ON parameter) in the signal output route from the currently selected input channel to the MIX bus corresponding to this send setting section 230. Touching this button enables the ON/OFF switching operation by toggling.

The send level symbol 231 is a level indicator. In the other modes, the send level symbol 231 is used to indicate the send level, but in the FIX mode, because the send level parameter is not involved, the send level symbol 231 is used as an indicator indicating whether or not a signal is sent from the currently selected input channel to the corresponding bus. Concretely, when the corresponding send ON switch is ON, the send level symbol 231 shows the bus number of the corresponding bus (in a second style), which indicates that a signal in the selected input channel is sent to the MIX bus corresponding to this send setting section 230 without control on its level. When the send ON switch of OFF, it is hatched (in a third style), which indicates that no audio signal in the selected input channel is sent to the MIX bus corresponding to this send setting section 230.

Next, the send setting sections 230 corresponding the buses of the VARI type each include a send level symbol 233, a PRE/POST button 234, and a send ON button 235. They are indicators indicating states of the send level fader 53, the PRE/POST switch 52, and the send ON switch 54 (values of the SL parameter, the PRE parameter, and the ON parameter) respectively, in the signal output route from the currently selected input channel to the MIX bus corresponding to this send setting section 230.

Among them, the send level symbol 233 shows the state of the send level fader 53 while bearing ON color defined for each send-destination bus similar to the ON color of the output signal symbol 216*c* (in a first style) when the corresponding send ON switch is ON, and bearing OFF color defined commonly for the buses similar to the OFF color of the output signal symbol 216*b* (in a fourth style) when the corresponding send ON switch is OFF, thereby indicating that no audio signal in the selected input channel is sent to the MIX bus corresponding to this send setting section 230. Therefore, only by seeing the send level symbol 233, a user can recognize whether a signal is sent or not and also recognize the send destination when the signal is sent.

The PRE/POST button 234 and the send ON button 235 are also operation sections accepting a switching operation of the corresponding switches. A value of the SL parameter corresponding to the send level fader 53 can be set by a rotation operation of the send knob 141 as described above.

Next, the send setting sections 230 corresponding to the buses of the MIX_MINUS type each include a send level symbol 236 and a minus-one button 237. They are indicators respectively indicating states of the MOL fader 56 and the MO switch 55 (values of the MOL parameter and the MO_ON parameter) in the signal output route from the currently selected input channel to the MIX bus corresponding this send setting section 230.

The send level symbol 236 indicates the value of the MOL parameter while bearing ON color defined for each bus when the corresponding MO switch 55 is ON (in the first style), similarly to the case where the send ON switch 54 in the VARI type is ON, which allows a user to recognize level of a sent signal. On the other hand, when the MO switch 55 is OFF, it does not indicate the value of the MOL parameter, but indicates the bus number of the corresponding bus instead of the signal level similarly to the case where the send ON switch 51 in the FIX type is ON (in the second style), thereby indicating that a signal in the selected input channel is sent to the MIX bus corresponding to this send setting section 230 without control on its level, which allows a user to recognize that a signal is sent to the bus without being level-adjusted.

Further, since the value of the MOL parameter is not indicated on the send setting display section 220 when the MO switch 55 is OFF, the user can easily recognize that the signal from the input channel corresponding to the send setting display section 220 is not presently removed (or attenuated) from the output to the mixing bus, and it is possible to prevent the user from careless and meaningless operation to edit the value of the MOL parameter in that state.

Table 2 shows the summary of the above-described styles how the send level symbols 231, 233 and 236 in the send setting sections 230 are displayed.

TABLE 2

| Display Styles of Send Level Symbols regarding MIX Buses of Respective Types |
|---|
| FIX type |
| value of the ON parameter is: |
| ON → number of the send-destination bus |
| OFF → hatching indicating that a signal is not sent |
| VARY type |
| value of the ON parameter is: |
| ON → bear ON color and indicate a value of the SL parameter |
| OFF → bear OFF color and indicate a value of the SL parameter |
| MIX_MINUS type |
| value of the MO_ON parameter is: |
| ON → bear ON color and indicate a value of the MOL parameter |
| OFF → number of the send-destination bus |

The selected channel display section 240 is a section for displaying various kinds of information and accepting an operation, regarding the currently selected input channel and includes, for example, buttons 241 and a meter 242. This section has only a little to do with the characteristics of this embodiment and therefore a detailed description thereof will be omitted.

Next, the data structure of the parameters used in the signal processing in the digital mixer 10 will be described.

In the digital mixer 10, the values of the parameters used in the signal processing in the DSP 18 are stored in the current memory as described above. Therefore, the structure of data stored in the current memory is shown in FIG. 7.

Figure 7:
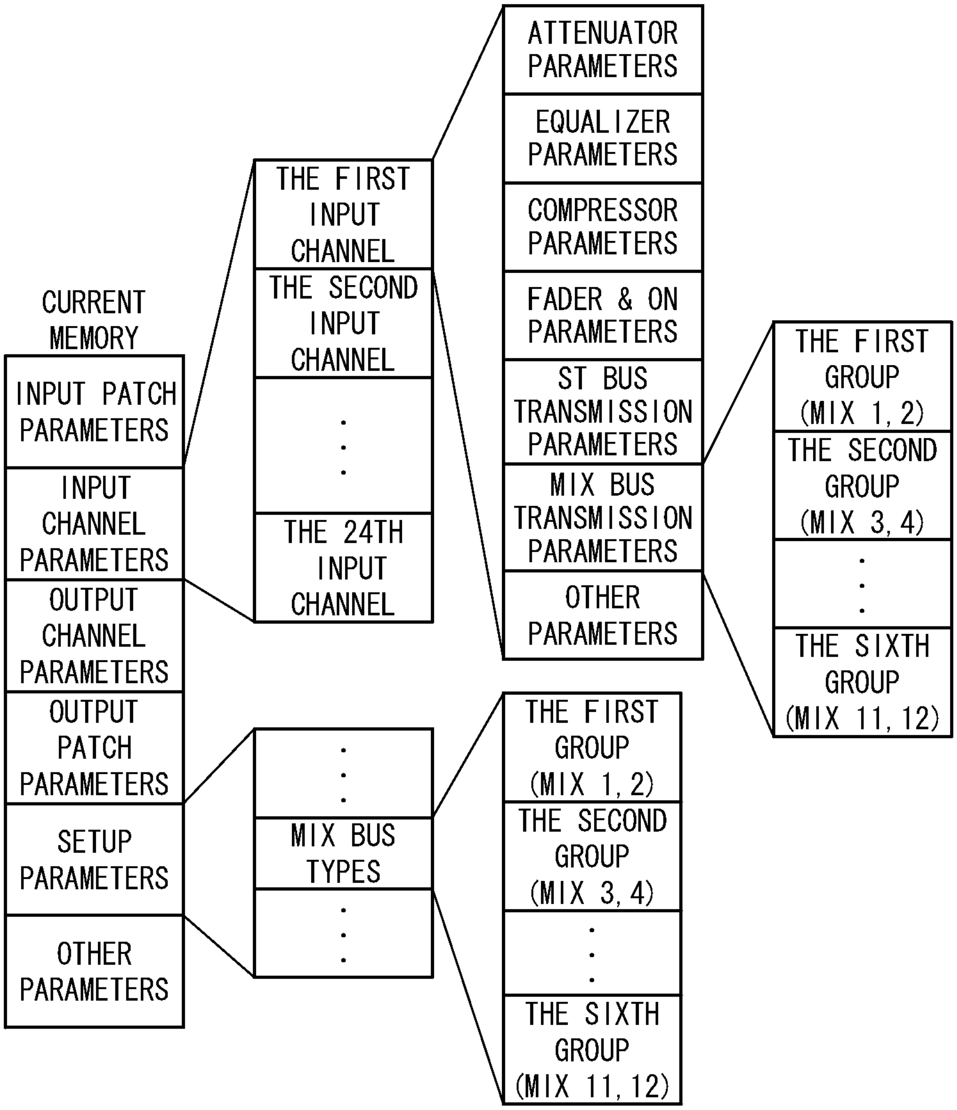
FIG. 7 is a chart showing the structure of data stored in a current memory of the digital mixer shown in FIG. 1.

As shown in FIG. 7, the data stored in the current memory are roughly divided into input patch parameters being parameters regarding the operation of the input patch 33, input channel parameters being parameters regarding the operation of the input channels 40, output channel parameters being parameters regarding the operation of the ST output channel 81 and the MIX output channels 82, output patch parameters being parameters regarding the operation of the output patch 34, setup parameter indicating the setting status defining the structure of the signal processing in the digital mixer 10, and other parameters.

Among them, since parts of the input channel parameters and the setup parameters have to do with the characteristics of this embodiment, they will be described in more detail.

First, as the input channel parameters, values of parameters used in each signal processing element shown in FIG. 3 are stored for each of the 24 input channels 40.

The parameters for each of the channels include the attenuator parameters used for the processing in the attenuator 41, the equalizer parameters used for the processing in the equalizer 42, the compressor parameters used for the processing in the compressor 43, the fader parameter used for the processing in the channel fader 44, and the ON parameter used for the processing in the ON switch 45.

Further, send parameters to the ST bus (ST bus send parameter) include the ON parameter of the TO_ST switch 46 and the pan parameter indicating a value of the sound localization position of the pan 47.

The parameters for each of the input channels further include a MIX bus send parameters used for the processing in the signal transmission routes to the MIX buses 70. A memory area of the MIX bus send parameters is prepared for each of the bus groups, and the kinds and number of the parameters whose values are actually stored differ depending on the type of the MIX buses as described above and are as shown in Table 1.

The setup parameters include MIX bus types being information designating the type of the MIX buses of each group. When the values of the MIX bus types are changed, the kinds and number of the parameters that are to be stored in the area of the MIX bus send parameters regarding each input channel, in the input channel parameter, are also changed according to the aforesaid change.

The other parts have nothing to do with the characteristics of this embodiment and therefore a description thereof will be omitted.

Next, characterizing processing executed by the CPU 11 in response to the operations of the respective parts in the digital mixer 10 will be described. The processing described here includes the setting of the parameters regarding the signal output routes from the input channels 40 to the MIX buses 70 and the control regarding the display of the send level blocks 215 and the send setting display section 220 according to the settings. Further, it is assumed that the input channels 40 are assigned to the assigned-channel strip section 120, and a description of processing when other channels (MIX output channels 82 or the like) are assigned will be omitted.

Figure 8:
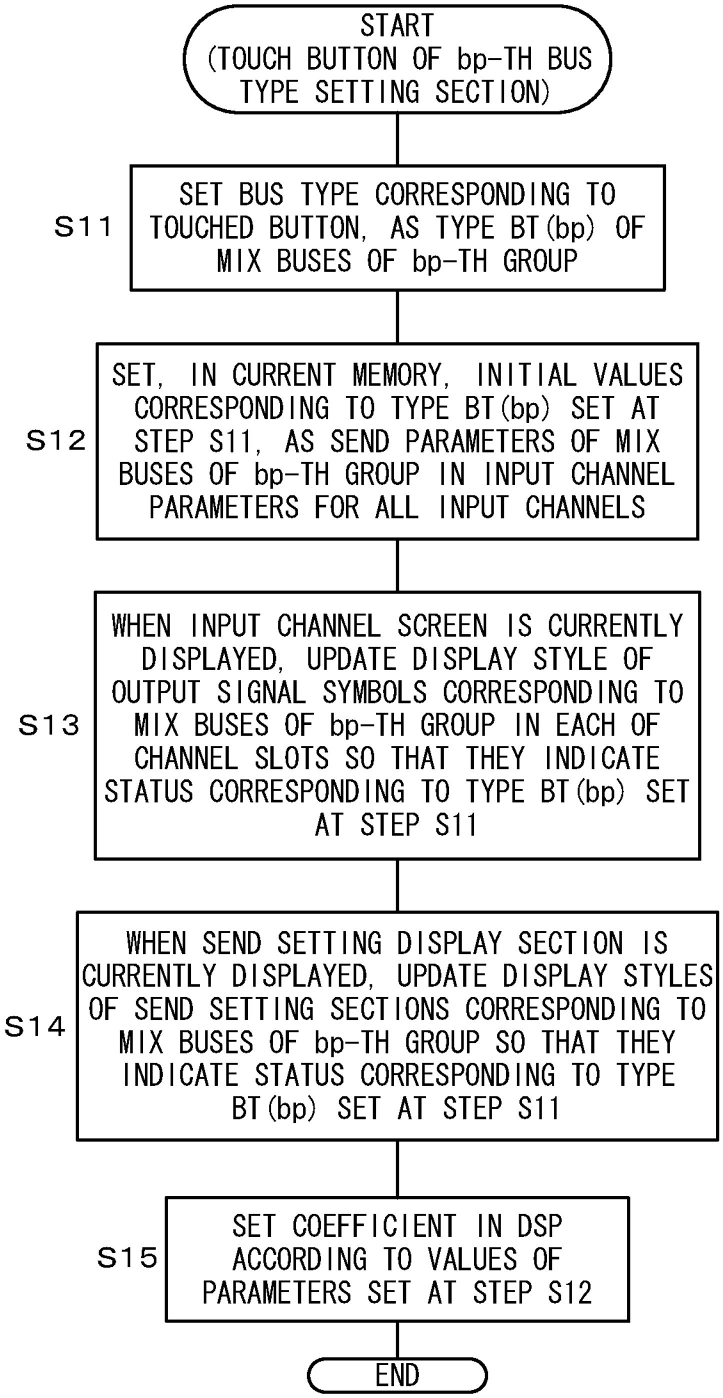
FIG. 8 is a flowchart of processing that a CPU shown in FIG. 1 executes when detecting an operation on a bus type setting section.

First, FIG. 8 shows processing when one of the buttons of the bus type setting sections 160 is operated in the MIX bus setting screen 150 shown in FIG. 5.

When detecting a touch operation on one of the buttons in the bp-th bus type setting section 160, the CPU 11 starts the processing shown in the flowchart in FIG. 8.

Then, first, as a type BT(bp) of the MIX buses of a bp-th group, a bus type corresponding to the touched button is set (S11). Then, as the send parameters of the MIX buses of the bp-th group, among the input channel parameters for all the input channels, the initial values (refer to Table 1) corresponding to the type set at Step S11 are set in the current memory (S12).

Thereafter, when the input channel screen 200 is currently displayed, display styles of the output signal symbols corresponding to the MIX buses of the bp-th group, in the send level blocks 215 of the channel slots 210 are updated so that they indicate the status corresponding to the type set at Step S11 (and corresponding to the initial values set at Step S12) (S13). Further, when the send setting display section 220 is currently displayed, display styles of the send setting sections 230 corresponding to the MIX buses of the bp-th group are also updated by later-described processing in FIG. 9 (S14).

Then, a coefficient is set in the DSP 18 so that the DSP 18 performs signal processing according to the values of the parameters set at Step S12 (S15) and the processing is ended.

By the above-described processing, the CPU 11 is capable of setting the type of the MIX buses according to an instruction from a user and also controlling the DSP 18 to perform the signal processing according to the type.

Figure 9:
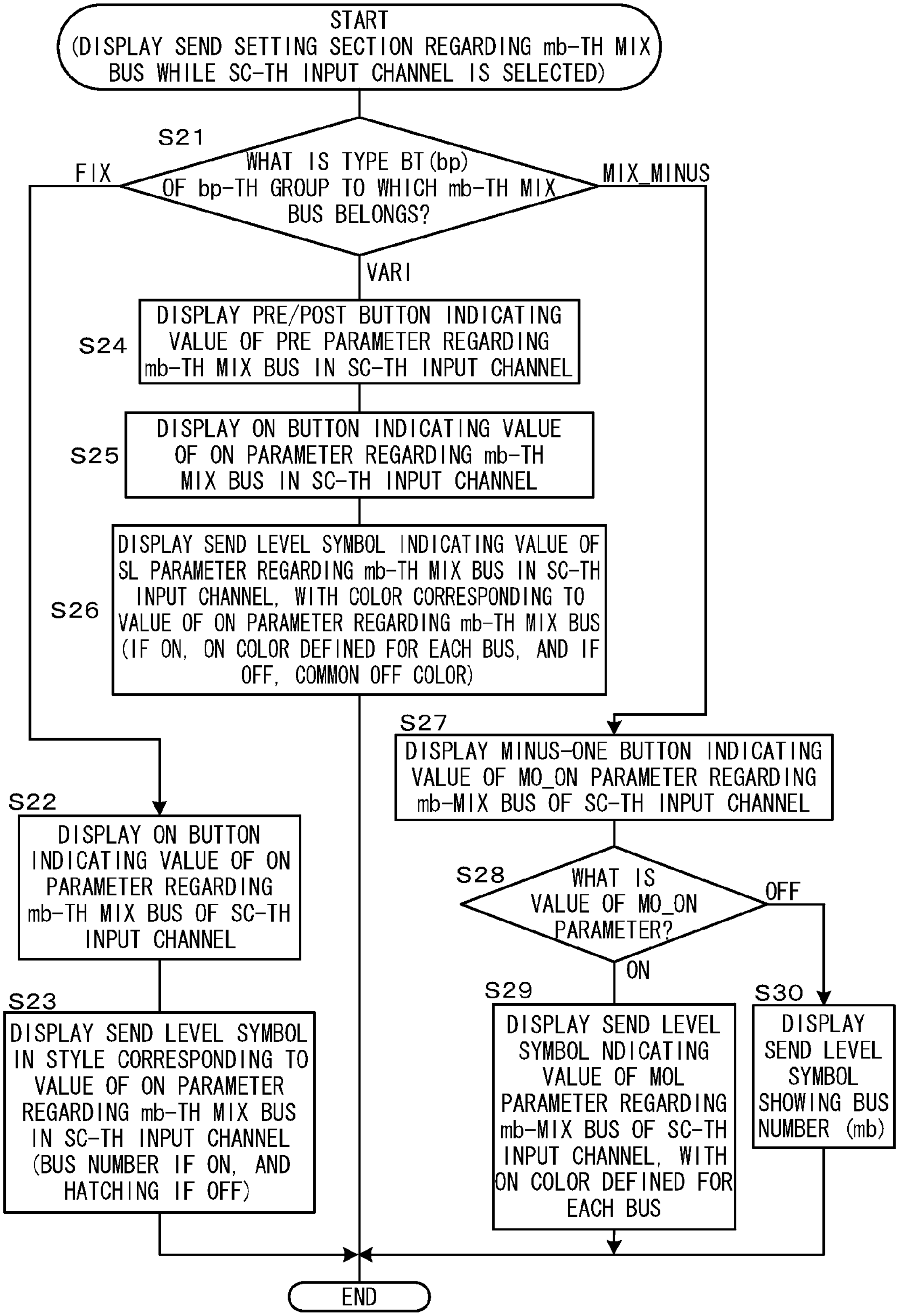
FIG. 9 is a flowchart of processing that the CPU executes when displaying a send setting section.

Next, FIG. 9 shows processing when the send setting section 230 corresponding to one MIX bus is to be displayed.

The CPU 11 starts the processing shown in FIG. 9 when newly displaying the send setting section 230 because the send setting display section 220 is newly displayed or because the type of the MIX bus is changed by the processing in FIG. 8. This processing is processing for displaying the send setting section 230 regarding an mb-th MIX bus while an SC-th input channel is selected.

In the processing in FIG. 9, the CPU 11 refers to the type BT(bp) of the bp-th group to which the mb-th MIX bus belongs (S21) to perform the display processing according to the type.

When the type is the FIX type, the send ON button 232 indicating a value of the ON parameter regarding the mb-th MIX bus of the SC-th input channel is displayed on the touch screen 110 (S22), and the send level symbol 231 is displayed in a style corresponding to the value of the ON parameter (S23). Then the processing is ended. Here, the send level symbol 231 indicates the bus number when the value of the ON parameter is ON, while being hatched when the value of the ON parameter is OFF.

Next, when the type is the VARI type, the PRE/POST button 234 and the send ON button 235 respectively indicating a value of the PRE parameter (PRE/POST) and a value of the ON parameter regarding the mb-th MIX bus in the SC-th input channel are displayed on the touch screen 110 (S24, S25). In addition, the send level symbol 233 indicating a value of the SL parameter regarding the same MIX bus is displayed with the color corresponding to the value of the ON parameter (S26). Then, the processing is ended. Here, the send level symbol 233 is displayed with the ON color defined for each bus when the value of the ON parameter is ON, and is displayed with the OFF color defined commonly to the buses when the value of the ON parameter is OFF.

When the type is the MIX_MINUS type, first, the minus-one button 237 indicating a value of the MO_ON parameter regarding the mb-th MIX bus of the SC-th input channel is displayed on the touch screen 110 (S27). Thereafter, when the value of the MO_ON parameter is ON (S28), the send level symbol 236 indicating a value of the MOL parameter regarding the same MIX bus is displayed with the ON color defined for each bus in the same manner as that at Step S26 (S29), and when the value of the MO_ON parameter is OFF, the send level symbol 236 indicating the number (mb) of the send-destination bus is displayed (S30). Then, the processing is ended. When the value of the ON parameter is ON, the display at Step S30 and the display at Step S23 are in the same manner.

Through the above-described processing, the CPU 11 is capable of displaying the single send setting section 230 in the send setting display section 220 on the touch screen 110 in the style described by using FIG. 6. In order to display a plural ones of the send setting sections 230, the processing in FIG. 9 is repeated a plurality of times. A description of processing for displaying sections except the send setting section 230 in the send setting display section 220 will be omitted.

Figure 10:
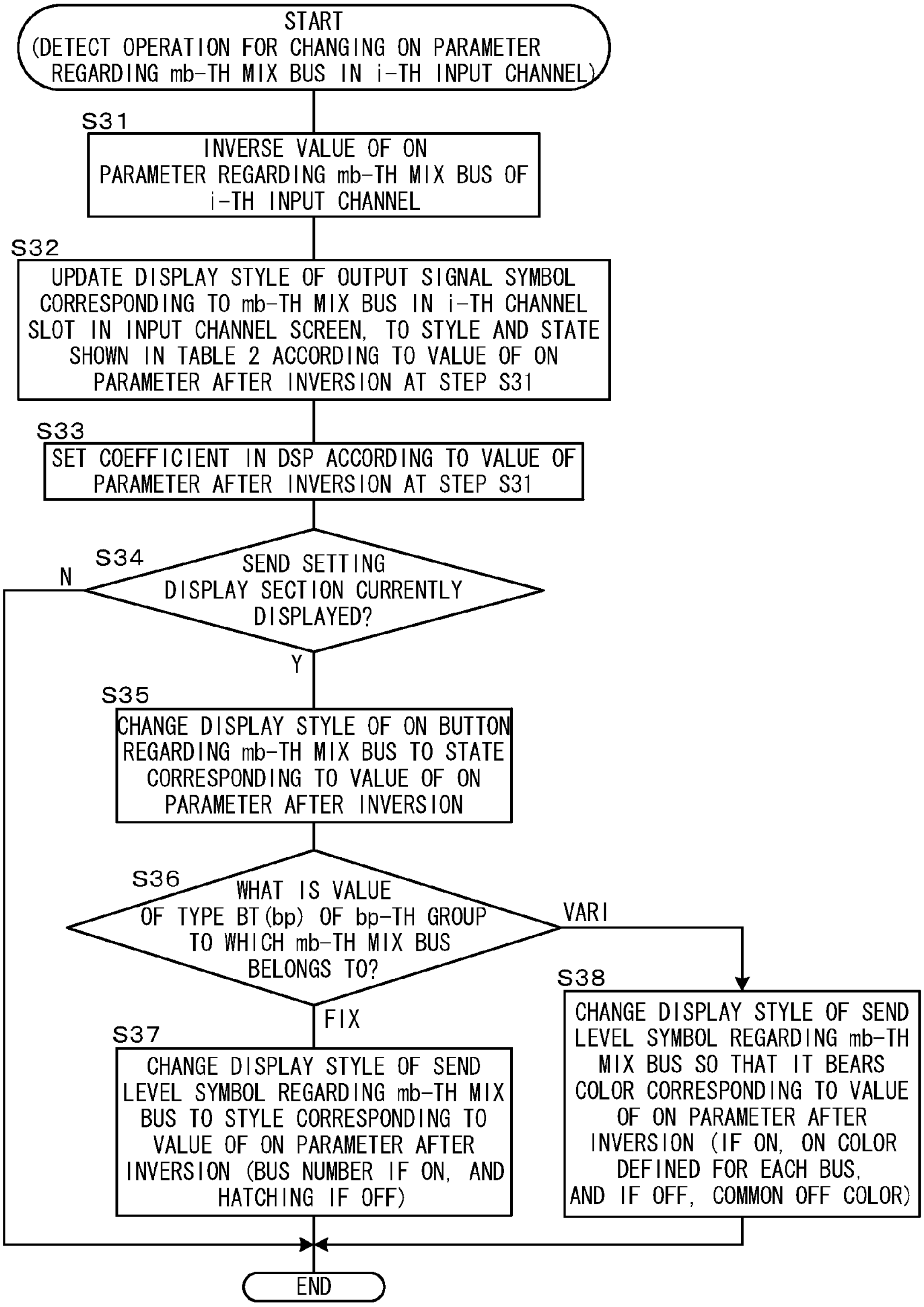
FIG. 10 is a flowchart of processing that the CPU executes when detecting an operation for changing an ON parameter.

Next, FIG. 10 shows processing when an operation for changing a value of the ON parameter is detected.

When detecting the operation for changing the value of the ON parameter in any one of the signal transmission routes, such as touching on the send ON button 232 or 235 or touching on the output signal symbol 216*a*, the CPU 11 starts the processing shown in FIG. 10. This processing is processing when an operation for changing the ON parameter regarding the mb-th MIX bus in the i-th input channel is detected.

In the processing in FIG. 10, the CPU 11 first inverses the value of the ON parameter whose change operation is detected (S31). Then, the display style of the output signal symbol 216 corresponding to the mb-th MIX bus in the i-th channel slot in the input channel screen 200 is updated to the style and state described by using FIG. 6, according to a value of the ON parameter after the inversion (S32), and a coefficient is set in the DSP 18 so that the DSP 18 performs signal processing according to the value of the ON parameter after the inversion at Step S31 (S33).

Thereafter, when the send setting display section 220 is not currently displayed on the touch screen 110 (S34), the processing is ended here, but when the send setting display section 220 is currently displayed, the CPU 11 goes to processing at and after Step S35 regarding the display update of the send setting display section 220.

Here, first, a display style of the send ON button regarding the mb-th MIX bus (in the send setting section 230 corresponding to this MIX bus) is changed to a state corresponding to the value of the ON parameter after the inversion (S35). Then, the type BT(bp) of the bp-th group to which the mb-th MIX bus belongs is referred to (S36), a display style of the send level symbol is updated according to this type, and the processing is ended. Since, in the MIX_MINUS type, there is no ON parameter present, branches here are the FIX type and the VARI type. Then, when the type is the FIX type, according to the value of the ON parameter after the inversion, a display style of the send level symbol 231 regarding the mb-th MIX bus is changed so that it indicates the bus number when the value is ON and is hatched when the value is OFF (S37). When the type is the VARI type, according to the value of the ON parameter after the inversion, color of the send level symbol 233 regarding the mb-th MIX bus is changed to the ON color defined for each bus when the value is ON, and to the common OFF color when the value is OFF (S38).

Through the above processing, the CPU 11 is capable of changing the value of the ON parameter according to a user's operation and is also capable of updating the screen displayed on the touch screen 110 to the state corresponding to the value after the change.

Figure 11:
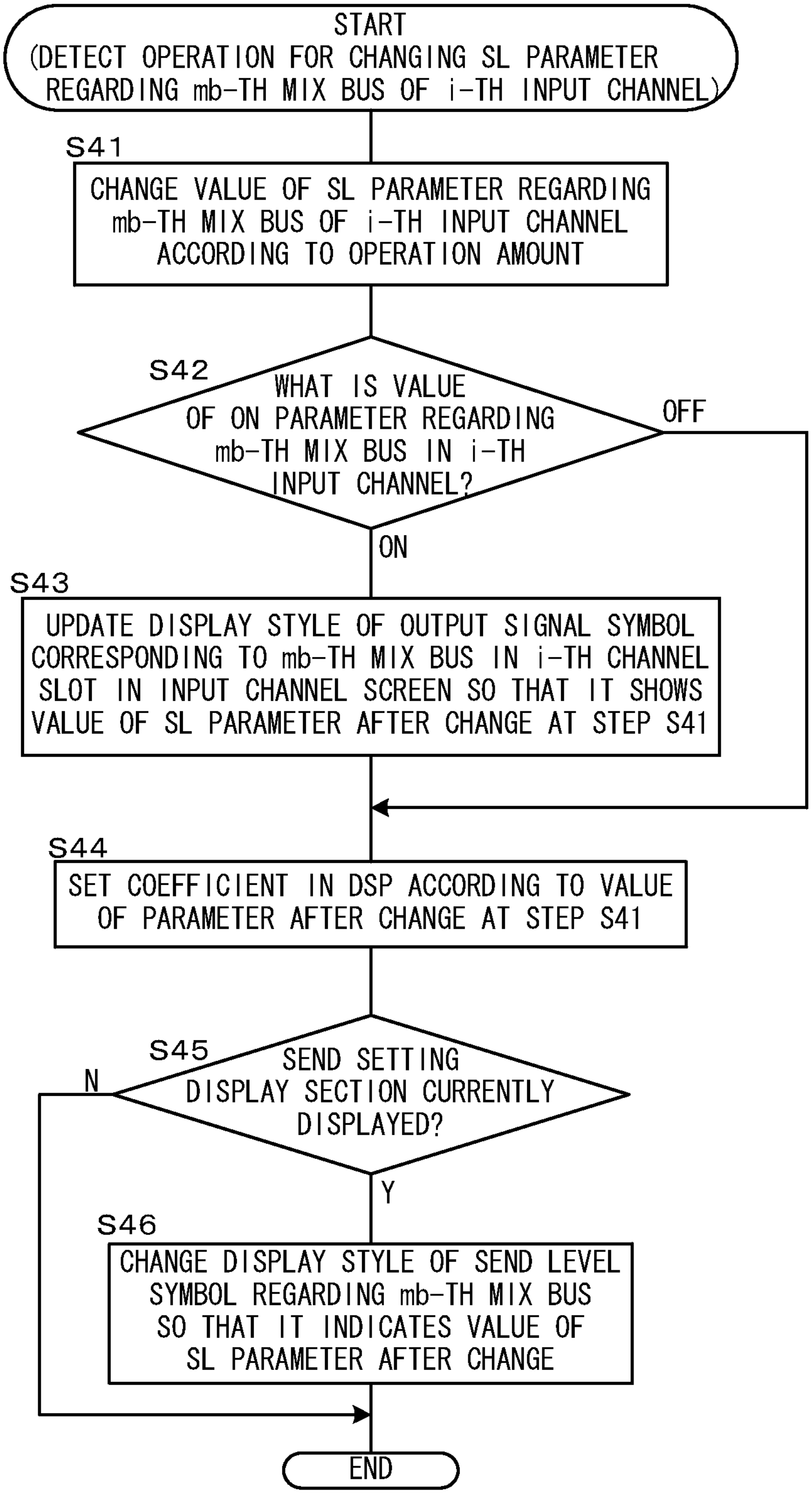
FIG. 11 is a flowchart of processing that the CPU executes when detecting an operation for changing a SL parameter.

Next, FIG. 11 shows processing when an operation for changing a value of the SL parameter is detected.

When detecting the operation for changing the value of the SL parameter in any one of the signal transmission routes, such as a rotation operation of the send knob 141 corresponding to the MIX bus of the FIX type, the CPU 11 starts the processing shown in the flowchart in FIG. 11. This processing is processing when the operation for changing the SL parameter regarding the mb-th MIX bus of the i-th input channel is detected.

In the processing in FIG. 11, the CPU 11 first changes the value of the SL parameter whose change operation is detected, according to a detected operation amount (S41). Then, when a value of the corresponding ON parameter is ON (S42), a display style of the output signal symbol 216*c* corresponding to the mb-th MIX bus in the i-th channel slot in the input channel screen 200 is updated so that it indicates the value of the SL parameter after the change (S43). When the value of the ON parameter is OFF, since the value of the SL parameter is not displayed through the output signal symbol 216*b*, the update is not necessary and is not performed.

Then, in either case, a coefficient is set in the DSP 18 so that the DSP 18 performs signal processing according to the value of the parameter after the inversion at Step S41 (S44).

Thereafter, when the send setting display section 220 is not currently displayed on the touch screen 110 (S45), the processing is ended here, but when it is currently displayed, a display style of the send level symbol 233 regarding the mb-th MIX bus is changed so that it indicates the value of the SL parameter after the change, whereby the display of the send setting display section 220 is updated (S46), and then the processing is ended. In this case, color of the send level symbol 233 is not changed. Further, since the SL parameter is involved only in the VARI type, there is no branching of the processing according to the type here.

Through the above-described processing, the CPU 11 is capable of changing the value of the SL parameter according to a user's operation and also is capable of updating the screen displayed on the touch screen 110 to the state corresponding to the value after the change.

Figure 12:
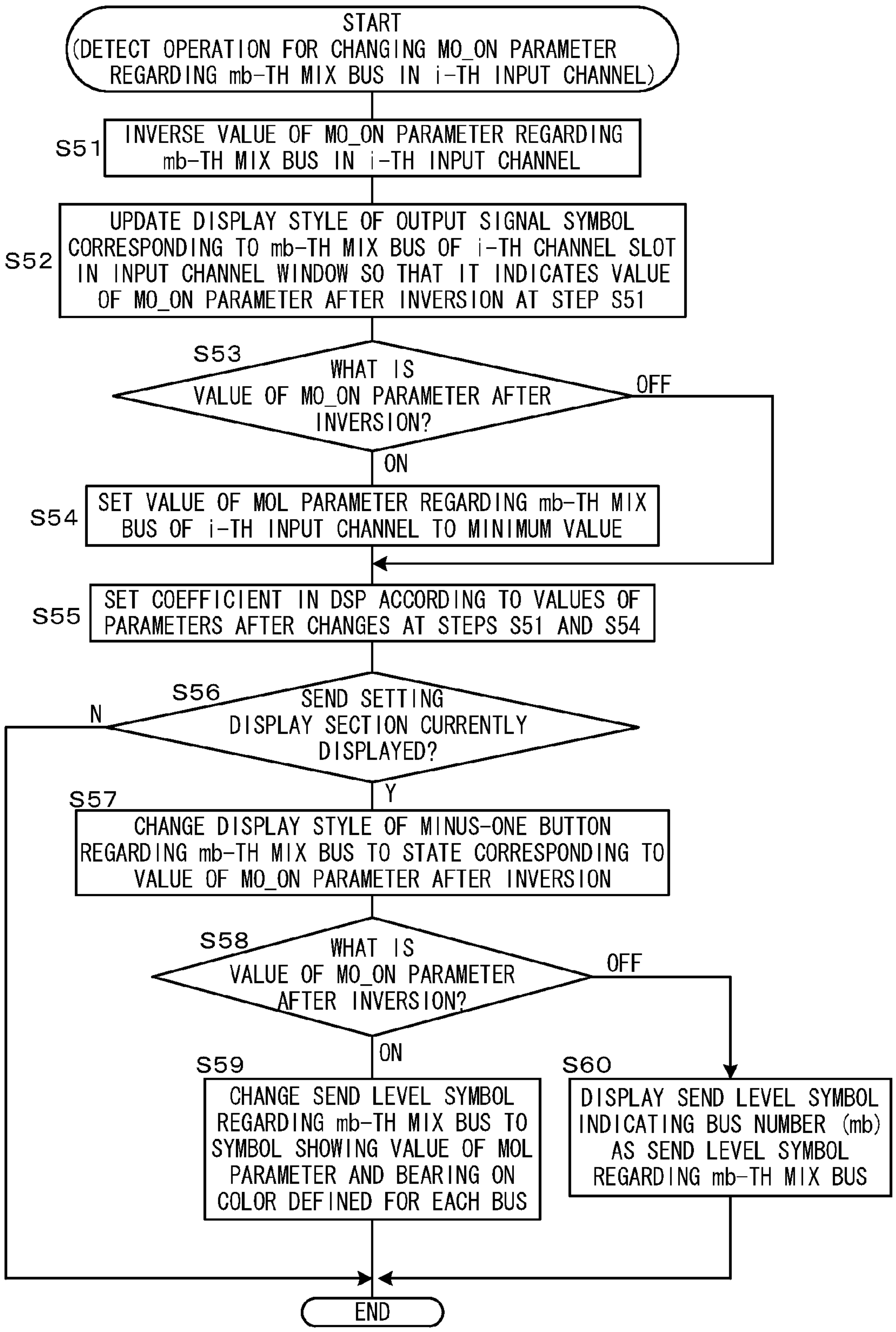
FIG. 12 is a flowchart of processing that the CPU executes when detecting an operation for changing a MO_ON parameter.

Next, FIG. 12 shows processing when an operation for changing a value of the MO_ON parameter is detected.

When detecting the operation for changing the value of the MO_ON parameter in any one of the signal transmission routes, such as touching on the minus-one button 237 or touching on the output signal symbol 216*d*, the CPU 11 starts the processing shown in the flowchart in FIG. 12. This processing is processing when the operation for changing the MO_ON parameter regarding the mb-th MIX bus in the i-th input channel is detected.

In the processing in FIG. 12, the CPU 11 first inverses the value of the MO_ON parameter whose change operation is detected (S51). Then, a display style of the output signal symbol 216*d* corresponding to the mb-th MIX bus in the i-th channel slot in the input channel screen 200 is updated so that it indicates a value of the MO_ON parameter after the inversion (S52). In this case, there is no need to refer to values of the MO_ON parameter of other input channels, and for a specific MIX bus, values of the MO_ON parameter regarding a plurality of the input channels may be ON simultaneously.

Then, when the value of the MO_ON parameter after the inversion is ON, that is, when the value of the MO_ON parameter is changed from OFF to ON (S53), a value of the corresponding MOL parameter is set to the minimum value ($-\infty$) as an initial value (S54). This setting is made so that a signal of the corresponding input channel can be excluded from the input signals to the MIX bus, that is, so that an input audio signal can be set to zero level by the MOL fader 56, only by turning on the MO switch 55, thereby making it possible to obtain the same effect as the effect of shutting off the transmission route. Conversely, when the value of the MO_ON parameter after the inversion is OFF, the MOL fader 56 is not used, and therefore, there is no need to change the value of the MOL parameter at this instant, and the change processing is not performed here.

In either case, a coefficient is set in the DSP 18 so that the DSP 18 performs signal processing according to the values of the parameters after the changes at Steps S51 and S54 (S55).

Thereafter, when the send setting display section 220 is not currently displayed on the touch screen 110 (S56), the processing is ended here, but when it is currently displayed, the CPU 11 goes to processing at and after Step S57, regarding the display update of the send setting display section 220.

Here, first, a display style of the minus-one button 237 regarding the mb-th MIX bus is changed to a state corresponding to the value of the MO_ON parameter after the inversion (S57). Further, when the value of the MO_ON parameter after the inversion is ON (S58), the send level symbol 236 regarding the mb-th MIX bus is changed to a symbol showing the value of the corresponding MOL parameter and bearing the ON color which is defined for each bus (S59), and then the processing is ended. When the value of the MO_ON parameter after the inversion is OFF, the same send level symbol 236 is changed to a symbol showing the corresponding bus number (mb) (S60), and then the processing is ended. Since the MO_ON parameter is involved only in the MIX_MINUS type, there is no branching of the processing according to the type either.

Through the above-described processing, the CPU 11 is capable of changing the value of the MO_ON parameter according to a user's operation and is also capable of updating the value of the corresponding MOL parameter and the screen displayed on the touch screen 110 according to the value after the change.

Figure 13:
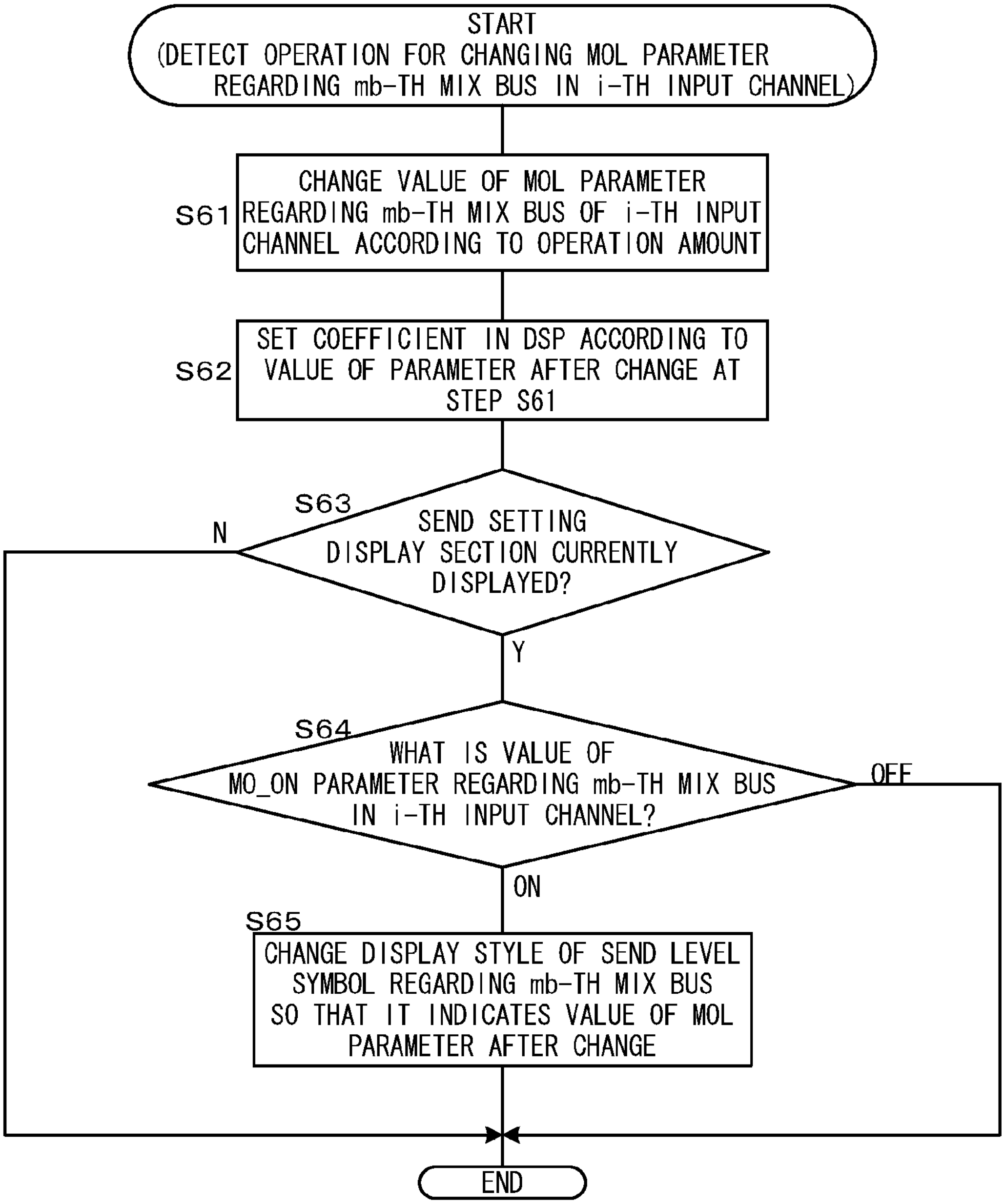
FIG. 13 is a flowchart of processing that the CPU executes when detecting an operation for changing a MOL parameter.

Next, FIG. 13 shows processing when an operation for changing a value of the MOL parameter is detected.

When detecting the operation for changing the value of the MOL parameter in any one of the signal transmission routes, such as a rotation operation of the send knob 141 corresponding to the MIX bus of the MIX_MINUS type, the CPU 11 starts the processing shown in the flowchart in FIG. 13. This processing is processing when the operation for changing the value of the MOL parameter for the mb-th MIX bus of the i-th input channel is detected.

In the processing in FIG. 13, the CPU 11 first changes the value of the MOL parameter whose change operation is detected according to a detected operation amount (S61) and also sets a coefficient in the DSP 18 so that the DSP 18 performs signal processing according to a value of the parameter after the change at Step S61 (S62).

Thereafter, when the send setting display section 220 is not currently displayed on the touch screen 110 (S63), the processing is ended here, but when it is currently displayed, the CPU 11 goes to processing at and after Step S64, regarding the display update of the send setting display section 220.

Then, here, when a value of the MO_ON parameter corresponding to the MOL parameter changed at Step S61 is ON (S64), a display style of the send level symbol 236 regarding the mb-th MIX bus is changed so that it indicates the value of the MOL parameter after the change (S65), and then the processing is ended. When the value of the MO_ON parameter is OFF, the send level symbol 236 is controlled to indicate the corresponding bus number and does not indicate the value of the MOL parameter, and therefore, the update of the display is not necessary, and the processing is ended here.

Through the above-described processing, the CPU 11 is capable of changing the value of the MOL parameter according to a user's operation and is also capable of updating the screen displayed on the touch screen 110 to the state according to the value after the change.

Incidentally, when the value of the corresponding MO_ON parameter is OFF, the operation of the send knob 141 is invalid as described above. Therefore, when the processing in FIG. 13 is performed, the result of the processing at Step S64 should always be "ON", and this processing is provided for confirmation.

Further, it is possible to edit the value of the MOL parameter by operating the rotary encoder 133 after assigning the parameter to the rotary encoder 133 on the console 100 by touching the corresponding send level symbol 236, and to edit the value of the MOL parameter by performing a drag operation near the corresponding send level symbol 236 so as to rotate this symbol. In such a case as well, when the value of the corresponding MO_ON parameter is OFF, the operation for editing the value of the MOL parameter is preferably made invalid.

However, even making the value of the MOL parameter editable in a state where the value of the MO_ON parameter is OFF causes no problem. Even when the value of the MOL parameter is edited in this state, the edit is not reflected in the signal processing, and are reset at an instant when the value of the MO_ON parameter becomes ON. Therefore, the editing operation only results in no use.

In the digital mixer 1, by the above-described processing, it is possible to set an arbitrary line of the MIX buses 70 to the MIX_MINUS type according to a user's operation, and in the MIX bus of this line, it is possible to easily make the setting for removing, from the mixing result, an audio signal from any one input channel or more. Further, in the mixing, the setting for lowering the level instead of completely removing the audio signal sent from the input channel can be easily made.

Further, under such setting, a user easily knows in which MIX bus and for which input channel, the signal mixing excluding a signal of the input channel is progressing. Therefore, it can be said that there is low risk that the state where a specific signal is removed is broken by an erroneous operation.

Further, in the send setting display section 220, the display style used for the display regarding the FIX type or the VARI type is also used as the display style when the settings regarding the signal output from a certain input channel to the MIX bus of the MIX_MINUS type line are displayed. Therefore, a user easily and intuitively knows the states of the parameters regarding the signal inputted to each line of the MIX bus 70, even if the number of the types selectable for the buses increases.

Specifically, the display style of the send level symbol in the state where the MO_ON parameter is OFF in the MIX_MINUS type is made common to the display style of the send level symbol in the state where the ON parameter is ON in the FIX type, considering the fact that the signal is outputted without control on its level in the both states. In addition, the display style of the send level symbol in the state where the MO_ON parameter is ON in the MIX_MINUS type is made common to the display style of the send level symbol in the state where the ON parameter is ON in the VARI type, considering the fact that the signal is outputted after being controlled on its level in the both states. This makes it possible to display values of the parameters necessary in the respective types without complicating the appearance of the screen.

So much for the description of the embodiment, but it goes without saying that the structure and concrete processing of the device, the display styles on the screens, the operation methods, and so on are not limited to those described in the above embodiment.

For example, in the above-described embodiment, the send-destination bus number is displayed to indicate that the signal is outputted without control on its level, but this is not essential. This indication may be displayed in any manner since, in this case, there is no parameter to be displayed in the send level symbol and thus any of the shape, color, hatching, or the like can be set.

Further, in the case of the VARI type, the value of the SL parameter is indicated by the send level symbol even when the ON parameter is OFF, but only an indication indicating that the signal is not sent may be shown similarly to the case where the ON parameter is OFF in the FIX type. Further, the discriminated use of the ON color and the OFF color in the VARY type is not essential either, and the discrimination need not be made. Hatching, patterns, or the like may be used for the discrimination, if the discrimination is made.

Further, when the values of the MO_ON parameter are ON in a plurality of the input channels for a specific-line MIX bus, values of the MOL parameter corresponding to these MO_ON parameters may be changed in linkage according to a user's operation or may be a common value.

Further, the above embodiment describes the example where the level is adjusted by the MOL fader 56 when the value of the MO_ON parameter is "ON", but conversely, the level may be adjusted when the value is "OFF" (in this case, the value of the MOL parameter is initialized to "$-\infty$" when the value of the MO_ON parameter is changed from "ON" to "OFF").

Specifically, the value of the MO_ON parameter can take two states, and by supplying a signal of the input channel 40 as it is to the MIX bus when the MO_ON parameter takes one of the values and supplying a signal to the MIX bus after its level is adjusted when the MO_ON parameter takes the other value, it is possible to realize the same function as that of the above-described embodiment, though a different impression is given to a user.

Neither, is it essential that the type of the buses is switchable between the MIX_MINUS type and the other types. Even if the type is switchable, it is not necessary that both the VARI and FIX are selectable as the types other than the MIX_MINUS type, and still other types may be selectable. Provided that at least one line is capable of functioning as a bus of the MIX_MINUS type, it is possible to achieve the effect that the setting for removing or attenuating an audio signal inputted from any one input channel or more can be easily made.

Further, the above embodiment describes the example where the type is set for each group composed of two lines of the buses. But, this is not essential, and the type may of course be selectable line by line.

Further, the above embodiment describes the example where the MIX buses 70 are divided into six groups and the total number of their lines is twelve. But, the invention is applicable to the digital mixer 10 including at least the MIX bus of one line.

Further, the digital mixer 10 can be realized not only by dedicated hardware but also as a function of DAW (digital audio workstation) application running on a PC.

Further, the structures and modification examples described hitherto may be applied in appropriate combination within a consistent range.

As is apparent from the above description, according to the digital mixer of the invention, it is possible to easily and reliably make the setting for removing or attenuating an audio signal supplied from a specific input channel when audio signals are mixed, in a digital mixer that mixes, in mixing buses, audio signals supplied thereto from a plurality of input channels.

Therefore, applying the invention enables improvement in operability of the digital mixer.

What is claimed is:

1. A digital mixer comprising:

a signal processor comprising:

a plurality of input channels that receive audio signals input to the signal processor;

a first bus that mixes the input audio signals supplied thereto from the plurality of input channels; and a plurality of second buses that mix audio signals supplied thereto from the plurality of input channels; and a memory device storing, for each of the plurality of input channels, a first parameter indicating an ON/OFF state and a second parameter indicating a send level, wherein each of the plurality of input channels includes:

at least one sound controller that controls sound characteristics of one audio signal, among the input audio signals, input thereto;

a first controller that controls supply of the controlled one audio signal to the first bus; and a second controller that controls supply of the controlled one audio signal to at least one of the second buses based on the stored first and second parameters of the input channel to be supplied to the at least one second bus, and wherein the second controller:

controls a level of the controlled one audio signal supplied to the at least one second bus, in accordance with the send level indicated by the stored second parameter of the input channel to be supplied to the at least one second bus and supplies the level controlled one audio signal to the at least one second bus when the stored first parameter of the input channel to be supplied to the at least one second bus indicates the ON state; and supplies the controlled one audio signal to the at least one second bus, without controlling the level thereof, when the stored first parameter of the input channel to be supplied to the at least one second bus indicates the OFF state.

2. The digital mixer according to claim 1, further comprising a microprocessor programmed to execute:

a first parameter editing task that toggles the ON/OFF state of the stored first parameter of one of the plurality of input channels in response to a first operation of the respective second controller by a user, and upon the first parameter being changed from the OFF state to the ON state, the first parameter editing task further sets the corresponding second parameter thereof to a zero level as an initial value; and a second parameter editing task that changes the stored second parameter of one of the plurality of input channels, whose corresponding first parameter indicates the ON state, in response to a second operation by the user.

3. The digital mixer according to claim 1, further comprising:

a display device; and a microprocessor programmed to execute:

a display task that controls the display to:

display a button indicating the value of the stored first parameter of one of the plurality of input channels;

display the value of the stored second parameter when the corresponding stored first parameter of the one input channel indicates the ON state; and not display the value of the stored second parameter of the one input channel when the corresponding stored first parameter of the one input channel indicates the OFF state.

4. The digital mixer according to claim 2, wherein even when the value of the stored first parameter of one of the input channels is already set to the ON state, the first parameter editing task additionally sets the first parameter of another input channel, among the plurality of input channels, to the ON state.

5. The digital mixer according to claim 2, further comprising:

a display device; and wherein the microprocessor is programmed to execute:

a display task that controls the display to:

display a button indicating the value of the stored first parameter of one of the plurality of input channels;

display the value of the stored second parameter when the stored first parameter of the one input channel indicates the ON state; and not display the value of the stored second parameter when the corresponding stored first parameter of the one input channel indicates the OFF state, wherein the first parameter editing task changes, in response to the first operation by the user on the displayed button, the value of the stored first parameter thereof, and wherein the second parameter editing task changes, in response to the second operation by the user on the value of the corresponding stored second parameter displayed on the display device, the value of the corresponding stored second parameter thereof.

6. The digital mixer according to claim 1, wherein the send level is preset to a zero level as an initial value.

7. The digital mixer according to claim 1, wherein the second controller concurrently supplies the controlled one audio signal to a pair of second buses, among the plurality of the second buses.

8. The digital mixer according to claim 7, wherein the second controller controls the level of the controlled one audio signal, in accordance with the send level indicated by the respective stored second parameters of the input channels to be supplied to the pair of second buses, and supplies the level controlled one audio signal to each of the pair of second buses whose corresponding stored first parameter indicates the ON state.

9. The digital mixer according to claim 8, wherein the second controller supplies the controlled one audio signal to each of the pair of second buses, without controlling the level of the controlled one audio signal, whose corresponding stored first parameter indicates the OFF state.

10. The digital mixer according to claim 9, wherein the first bus comprises a stereo bus and the plurality of second buses comprise at least a plurality of mix-minus buses.

11. The digital mixer according to claim 10, wherein the first controller comprises an ON/OFF switch and a left/right pan that control the controlled one audio signal supplied to the stereo bus.

12. The digital mixer according to claim 11, wherein the second controller includes a first ON/OFF switch and a first fader that control the level of the controlled one audio signal supplied to one of the pair of second buses.

13. The digital mixer according to claim 12, wherein the second controller includes a second ON/OFF switch and a second fader that control the level of the controlled one audio signal supplied to the other of the pair of second buses.

14. The digital mixer according to claim 13, wherein the second controller bypasses the first or second fader when the stored first parameter of the respective input channel indicates the OFF state.

* * * * *